UNITED STATES PATENT OFFICE.

STUART GWYNN, OF NEW YORK, N. Y., ASSIGNOR TO ALFRED B. ELY, OF NEWTON, MASSACHUSETTS.

IMPROVEMENT IN IMPREGNATING FIBROUS AND POROUS MATERIALS.

Specification forming part of Letters Patent No. 46,466, dated February 21, 1865.

*To all whom it may concern:*

Be it known that I, STUART GWYNN, of the city, county, and State of New York, have invented or discovered a new and useful Improvement in Impregnating Fibrous and Porous Materials, of which the following is a full, clear, and exact description.

It is the object of my invention to impregnate fibrous and porous substances with a composition which shall be infused into the pores of such materials, so that they shall be changed in their character and be made nearly indestructible from hygrometric or thermometric atmospheric changes, and rendered water-proof without preventing the entrance or escape of air through their pores; and to this end my invention consists in impregnating fibrous and porous substances with a heated composition of paraffine and rubber or gutta-percha, or other gums, combined in proper proportions and diffusing it thoroughly through all the pores of these substances.

Paraffine is a compound of hydrogen and carbon, and, when melted by heat, is a known solvent of rubber, gutta-percha, and other gums. The compound solution of paraffine and rubber or gutta-percha, or other gums, I have discovered can, when heated and liquefied, be so incorporated with fibrous or porous substances as to render them water-proof and indestructible from atmospheric changes, heat, or dampness. When heated until liquefied this composition may be used with varying proportions of the gums and paraffine to suit the character of the materials into the pores of which it is to be infused, or that are to be impregnated with the composition. The impregnation may be effected by immerging the fibrous or porous materials into the composition, or by any other known and approved method, and cloth, paper, wood, and similar materials to which the heated liquid composition is applied must remain under impregnation long enough for the composition to penetrate every pore and become thoroughly incorporated with the fibers of the materials. When thus applied to woods of a porous character they become, from the impregnation, tougher, more durable, and indestructible from dry-rot, from moisture, or from alterations of atmospheric conditions, and will remain without change under the action of acids or alkalies; and it is obvious that with these new properties such woods so impregnated with this composition will have a more extended and widely-varied usefulness in the arts than they are capable of under any other condition. Cloths thus impregnated with this composition may be made water-proof without any interruption to a free passage of the air through them, and paper so impregnated can, under many conditions, be made an economical substitute for leather.

What I claim as my invention, and desire to secure by Letters Patent, is—

Impregnating cloth, paper, or other fibrous or porous substances with the composition above described, for the purposes set forth.

STUART GWYNN.

Witnesses:
W. M. PARKER,
ROYAL RICHARDSON.